Figure 4:
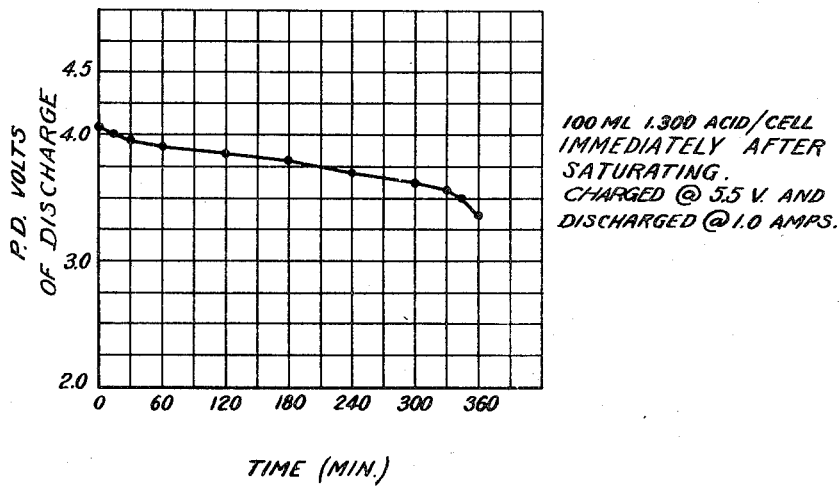

March 6, 1951     G. WHEAT     2,544,517
METHOD OF MAKING BATTERIES

Filed Jan. 6, 1947     2 Sheets-Sheet 1

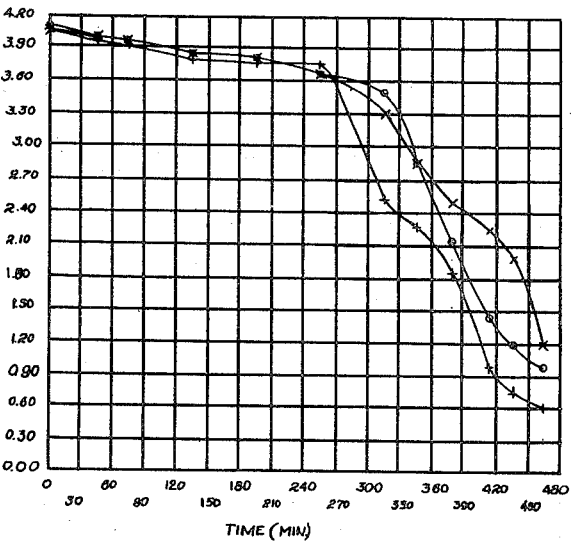

Fig. 1

100 ML. 1400 ACID/CELL
IMMEDIATELY AFTER SATURATING
GIVEN 4 CYCLES CHARGING @ 5.5 V.
AND DISCHARGING @ 1.0 AMP.

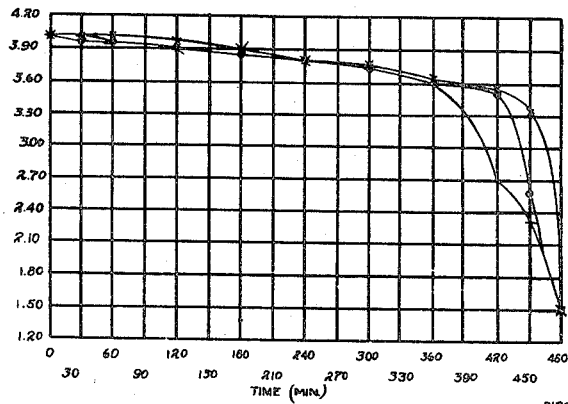

Fig. 2

100 ML. 1400 ACID/CELL
10 DAYS AFTER SATURATING
GIVEN 4 CYCLES CHARGING @ 5.5 V.
AND DISCHARGING @ 1.0 AMP.

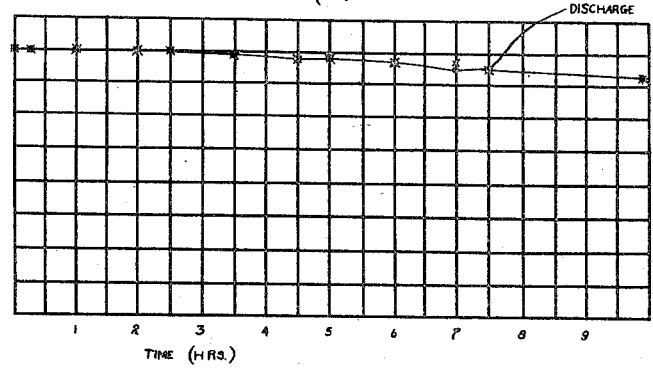

Fig. 3

+ BATTERY I
× BATTERY II
○ BATTERY III

100 ML. 1300 ACID/CELL
7 DAYS AFTER SATURATING AND
WITH NO CYCLING CHARGED 8 HRS. @
5.5 V. AND DISCHARGED @ 1.0 AMP.

Inventor
Grant Wheat
by Roberts, Cushman & Grover
Att'ys.

March 6, 1951   G. WHEAT   2,544,517
METHOD OF MAKING BATTERIES
Filed Jan. 6, 1947   2 Sheets-Sheet 2

Patented Mar. 6, 1951

2,544,517

UNITED STATES PATENT OFFICE 2,544,517

METHOD OF MAKING BATTERIES

Grant Wheat, Marlboro, Mass., assignor to Koehler Manufacturing Company, Marlboro, Mass., a corporation of Massachusetts Application January 6, 1947, Serial No. 720,439

2 Claims. (Cl. 136—176)

The present invention relates to a method of making batteries having an osmotic separator, as of balsa wood.

In the art of making non-spillable storage batteries, it has heretofore been disclosed, in my U. S. Patent 2,120,822, that osmotic materials such as balsa wood constitute a preferred solid separator medium in which the battery acid may be held by absorption and adsorption. It has also been disclosed in U. S. Patent 2,307,299 to Henry G. Powning, that in storage batteries of this type, the balsa wood separators may be still further improved for the purpose by subjecting them to heavy compression, transversely of the grain of the wood.

Using either the straight balsa wood separator, per se, or the compressed balsa wood separator, it has been customary practice in the art to assemble the dry formed battery plates in a suitable container, to position the separator between the positive and negative plates or between each pair of positive and negative plates where there is more than one pair—add the battery acid, and, as soon as the separators have been thoroughly wetted by the acid, to subject the assembled cell to repeated charging and discharging which is referred to as the "cycling" treatment of the battery. This "cycling" treatment is sometimes known as "working" the plates by charging and discharging at suitable voltages. The "worked plates" thereby have their electrical capacity developed. They are then charged, whereupon they are ready to be put into service.

Such cycling of the assembled cell has been essential to develop the capacity of the cell, on test, in order to enable it to meet the standard requirements of current output, when it is put into service, before recharging will be necessary. To accomplish this result at least four complete charging and discharging cycles are required, a cycle being one complete charging and discharging operation. This involves considerable time, equipment, and electrical power consumption, since the energy liberated by the discharging operation is not practically or economically useful and accordingly goes to waste.

It is an object of the present invention, accordingly, to improve the method of making and conditioning storage batteries, having the balsa wood type of separators therein, and to improve the uniformity and capacity with which such batteries will meet the standard test requirements. Other objects will appear from the following disclosure.

By the present invention it is discovered that, after assembling the dry-formed battery plates and an osmotic separator or separators, such as of balsa wood—preferably a separator or separators of this type which have been compressed, as disclosed in the Powning Patent 2,307,299 or which have been treated with boiling water and alkali as disclosed in my U. S. Patent 2,120,822, or both—in a suitable container, and after the battery acid is added thereto, it is desirable and effective to allow the thus assembled battery to stand, not only for a sufficient time to effect substantially complete apparent impregnation of the balsa wood separator by the battery acid but also the complete impregnation of the formed positive and negative plates, and for a prolonged period of time before subjecting the assembled cell to the cycling treatment. By so doing, it is found that by then subjecting the cell to only a single charging and discharging treatment, and then recharging, or directly to a charging treatment without any cycling or discharging of the battery whatever, the capacity of the battery and its ability to stand the test of remaining on continuous discharge for a required period of time and at a sustained amperage—has been developed therein far beyond the capacities and tests heretofore regarded as satisfactory. Accordingly, repeated cycling and recycling treatment is rendered unnecessary, or in fact any cycling treatment, in most cases, and the time and equipment necessary and power consumption required therefor is avoided.

In this procedure, the battery acid may be of higher concentration than is usually employed on wooden separators—e.g. sulphuric acid of a specific gravity of 1.4 instead of 1.28 or 1.30. Such stronger acid does not attack the balsa wood seriously and yet permeates the separator completely and quickly comes to a more dilute concentration, whereupon the charging operation rapidly develops the capacity of the cell. When the necessary amount of concentrated acid thus penetrates the separator, it may leave a space uncovered at the top. Accordingly, after standing and before the "cycling" treatment, or charging, the cell may be filled up to the required amount, with water. This brings the acid content of the battery to the required volume and to the operative specific gravity of 1.28 or 1.3. This added water gradually and uniformly permeates the separator and adjusts the acid therein to the proper concentration for the preliminary charging and discharging operations, if employed, and also for the charging operation, per se, as well as in the course of the discharge of the battery in actual service.

One reason for the observed difference in results accomplished by letting the assembled battery stand for a prolonged period of time is thought to be that although the osmotic separator, of balsa wood, as freshly wetted with acid, may appear to be thoroughly saturated it still retains voids or unsaturated capillaries which are filled with air. In any case, such areas present a physical and electrical resistance which is only gradually overcome in the repeated cycling treatment. In fact, in such areas the preliminary cycling treatment may liberate hydrogen or other gas therein, which would impede the further or complete saturation of the separator by the battery liquid, and hence interrupt or prevent uniform concentration of the acid and consequent activity and conductivity of the cell.

In a typical procedure in accordance with the present invention, dry compressed separators of balsa wood (which nevertheless contain some moisture) are assembled in the battery container between the preferably dry-formed, positive and negative plates in the usual way. The required amount of the battery acid—such as sulphuric acid of 1.4 specific gravity—is added. The battery as thus assembled is then allowed to stand at room temperature for a prolonged period of time—for example, preferably for at least five days or, if convenient, seven to ten days or longer. During this time complete permeation of the separator by the sulphuric acid is assured, not only to saturation of the open pores and passageways but in the closed osmotic cells of the wood also, by osmosis through the walls. It will also uniformly penetrate and saturate the battery plates. By so doing, not only is the separator swelled, completely to fill the space between the plates and conform accurately to the surfaces thereof and to become uniformly conductive, but the plates also are thoroughly wetted. Thus uniform conductivity is developed and assured throughout the system.

In this operation, the concentrated acid will be taken up by the separator and the top surface of the free acid may, in consequence, fall so as not to be at the desired level in the battery. But since it is more concentrated than is desired for charging and recharging, or for charging, or operation and use, water is desirably added to dilute the acid and also to raise the liquid level to the desired height in the battery.

(It may then be desirable to allow the battery to stand for a short while longer to permit diffusion of the water through the concentrated acid, both in the balsa wood separator and over and in the plates of the cell, thereby to bring the whole more uniformly to the desired concentration.)

After the assembled battery has been allowed to stand for the required length of time (or longer) it is then charged by imposing an electric potential thereon, and sending a current therethrough—for example at 5 volts with a current of 1 to 3 amperes. The battery, after fully charging, thereby develops the required ampere hour rate under standard conditions of test or use. Figs. 1–4 are performance curves used to compare the present invention with other known methods.

Two sets of three batteries each were assembled and prepared in these ways: that is, cycling and then charging those of the first set directly after thoroughly saturating the separator and dry formed plates with the battery acid, and cycling and charging those of the second set after saturating the separator dry-formed plate with the battery acid and allowing to stand for a period of 10 days, and finally discharging both sets of batteries at a current of one ampere, while recording the drop in voltage of the battery.

In these tests, each battery was given four cycling or charging and discharging treatments— the charging being effected at 5.5 volts and the discharging at the controlled rate of 1.0 ampere. The course of the drop in voltage during the final or fourth discharge of each (which would correspond to the discharge of the battery when put into actual service) was then observed and the results are plotted in the graphs of Fig. 1 and Fig. 2 respectively.

It will be observed from the results plotted in these two graphs that, with the batteries which had been cycled and then discharged immediately after substantial saturation of the separators and dry-formed plates by the acid added to them, the voltage fell, in the final discharge, to 3.3 volts or less at the end of 5½ hours (graph Fig. 1). On the other hand, with two of the three batteries which had been allowed to stand for 10 days' saturation of the separators and dry-formed plates by the battery acid, before cycling and discharging, the voltage fell in the final discharge only to 3.6 at the end of 7 hours and with the third of these batteries the voltage fell in the final discharge to 3.6 at the end of 6 hours (graph, Fig. 2).

However, similar tests, giving each battery no cycling whatever and only one charging treatment, directly after prolonged standing, were run and the results are plotted in Fig. 3. That is, three batteries were filled with 1.30 sp. gr. sulphuric acid. They were allowed to stand for one week, and were then brought to proper liquid level by adding more 1.30 acid, and were then put on charge at a constant voltage of 5.5 volts, for 8 hours. After being thus directly fully charged, without any cycling treatment, they were then put on discharge through variable resistances, and the discharge rate was maintained constant at 1.0 ampere. After 7½ hours, the voltage of one battery had fallen to 3.70 volts, and that of the other two to 3.75 volts.

A similar procedure was carried out, with a single battery, in which the battery plates and dry balsa wood separator were assembled, saturated with sulphuric acid of 1.30 specific gravity, and then, without being allowed to stand, was directly given a single charging at 5.5 volts. This battery was then discharged at 1.0 ampere, with the result shown in the graph of Fig. 4.

It would appear from this result, when compared with the results obtained with the three batteries, as plotted on the graphs of Fig. 3, that the voltage of the single battery continues to decline from the beginning of the discharge, whereas the three batteries which were charged after standing, and tested (as shown by Fig. 3) maintained their voltages nearly constant, for 3½ hours before even commencing to fall off appreciably. Moreover the three batteries actually remained at a potential above 3.6 volts for 10 hours, whereas the single battery (as shown by the graph in Fig. 4) fell off continuously from the start and to a voltage of 3.6 in 5 hours. Accordingly, preliminary cycling and re-cycling treatment may be omitted, and along with its omission a battery of longer life and higher and steadier potential is produced, especially when given a prolonged preliminary saturation treatment.

While in two of the procedures above described (Figs. 1 and 2) concentrated acid (1.4 sp. gr. was added to the battery and the battery then allowed to stand, followed by the addition of water, it is not to be understood that such enhanced concentration is essential. This is demonstrated in the examples illustrated by Figs. 3 and 4. Battery acid of the ultimately desired concentration may be added to the battery in the required amount—and the battery then allowed to stand before the cycling or charging treatment, with advantageous results, and more acid of the same specific gravity added, if required.

It should be understood that the present disclosure is for the purpose of illustration only and that this invention includes all modifications and equivalents which fall within the scope of the appended claims.

I claim:

1. Method of making storage batteries, of the wood separator type; comprising the steps of assembling the positive and negative plates in the battery container, interposing a permeable wood separator therebetween, filling the space between the plates with battery acid, of a concentration greater than that to be present in the completed battery for operation, allowing the thus assembled battery to stand for a prolonged period of time of at least several days, uncharged, diluting the acid therein to the required concentration, and charging the battery, preparatory to actual service, thereby to develop the capacity of the battery with respect to the operative conditions of the plates, separator and electrolyte.

2. Method of making storage batteries, of the balsa wood separator type, comprising the steps of assembling the positive and negative plates in the battery container, interposing a permeable balsa wood separator therebetween, filling the space between the plates with battery acid, of a concentration greater than that to be present in the completed battery for operation, allowing the thus assembled battery to stand for a prolonged period of time, of at least 5 days, uncharged, diluting the acid therein to the required concentration, and charging the battery, preparatory to actual service, thereby to develop the capacity of the battery with respect to the operative conditions of the plates, separator and electrolyte.

GRANT WHEAT.

REFERENCES CITED

The following references are of record in the file of this patent:

UNITED STATES PATENTS

| Number | Name | Date |
|---|---|---|
| 1,722,210 | Grimditch | July 23, 1929 |
| 1,953,591 | Creitz | Apr. 3, 1934 |
| 2,120,822 | Wheat | June 14, 1938 |
| 2,307,299 | Powning | Jan. 5, 1943 |

OTHER REFERENCES

Vinal, Storage Batteries, 3rd edition, 1940, pages 34, 35.